(12) United States Patent
Latrofa et al.

(10) Patent No.: US 10,054,019 B2
(45) Date of Patent: Aug. 21, 2018

(54) METHOD OF CONTROLLING THE OPERATION OF AN AFTERTREATMENT SYSTEM OF A MOTOR VEHICLE

(71) Applicant: GM GLOBAL TECHNOLOGY OPERATIONS LLC, Detroit, MI (US)

(72) Inventors: Giacomo Latrofa, Turin (IT); Giovanni Montinaro, San Pietro Vernotico (IT); Fabrizio Ramolivo, Canale (IT); Luisa Cusanno, Turin (IT); Matteo Venturini, Strambino (IT); Barbara Maisola, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 15/413,106

(22) Filed: Jan. 23, 2017

(65) Prior Publication Data
US 2017/0211443 A1    Jul. 27, 2017

(30) Foreign Application Priority Data
Jan. 22, 2016    (GB) .................................. 1601302.1

(51) Int. Cl.
*F01N 3/00* (2006.01)
*F01N 3/08* (2006.01)
(Continued)

(52) U.S. Cl.
CPC ......... *F01N 3/0885* (2013.01); *F01N 3/0842* (2013.01); *F01N 13/082* (2013.01); *F02D 41/0225* (2013.01); *F02D 41/0275* (2013.01)

(58) Field of Classification Search
CPC .... F01N 3/0885; F01N 3/0842; F01N 13/082; F01N 2250/03; F01N 2250/12;
(Continued)

(56) References Cited

U.S. PATENT DOCUMENTS

2005/0126162 A1    6/2005  Otake et al.
2009/0000274 A1*   1/2009  Stroh .................... F01N 3/0814
                                                  60/274
(Continued)

OTHER PUBLICATIONS

Reat Britain Patent Office, Great Britain Search Report for Great Britain Application No. 1601302.1, dated Jul. 27, 2016.

*Primary Examiner* — Audrey K Bradley
*Assistant Examiner* — Diem Tran
(74) *Attorney, Agent, or Firm* — Lorenz & Kopf, LLP (57) ABSTRACT

A method and apparatus are disclosed for controlling the operation of an aftertreatment system for a motor vehicle having a Lean $NO_x$ Trap and a tail pipe for conveying exhaust gasses from the LNT to the external environment. Values are calculated for a $NO_x$ content in the exhaust gasses flowing in the tail pipe and the quantity of $NO_x$ stored in the LNT. A $DeNO_x$ request index is calculated as a function of these values. A raw threshold value of the $DeNO_x$ request index is calculated as a function of a LNT temperature and of an exhaust gas mass flow. A corrected threshold value of the $DeNO_x$ request index is calculated as a function of the raw threshold value of the $DeNO_x$ request index and of a correction factor. A $DeNO_x$ regeneration is initiated when the calculated value of the $DeNO_x$ request index is larger than the corrected threshold value.

9 Claims, 7 Drawing Sheets

(51) Int. Cl.
*F01N 13/08* (2010.01)
*F02D 41/02* (2006.01)

(58) Field of Classification Search
CPC ............. F01N 2240/18; F01N 2410/12; F01N 2570/00; F01N 2900/1614; F02D 41/0225; F02D 41/0275
USPC .................................. 60/274, 295, 297, 301
See application file for complete search history.

(56) References Cited

U.S. PATENT DOCUMENTS

| | | | |
|---|---|---|---|
| 2009/0077951 A1* | 3/2009 | Arlt | F02D 41/0245 60/286 |
| 2011/0094210 A1 | 4/2011 | Suzuki et al. | |
| 2015/0298061 A1* | 10/2015 | Irisawa | F01N 3/0842 422/169 |
| 2016/0084185 A1* | 3/2016 | Theis | F02D 41/064 701/105 |

* cited by examiner

METHOD OF CONTROLLING THE OPERATION OF AN AFTERTREATMENT SYSTEM OF A MOTOR VEHICLE

CROSS-REFERENCE TO RELATED APPLICATION

This application claims priority to Great Britain Patent Application No. 1601302.1, filed Jan. 22, 2016, which is incorporated herein by reference in its entirety.

TECHNICAL FIELD

The present disclosure pertains to a method of controlling the operation of an aftertreatment system of a motor vehicle.

BACKGROUND

It is known that current automotive systems are equipped with exhaust gas aftertreatment systems. Among the various aftertreatment devices, Lean $NO_x$ Traps (LNT) may be used. A Lean $NO_x$ Trap (LNT) is a catalytic device containing catalysts, such as Rhodium, Pt and Pd, and adsorbents, such as barium based elements, which provide active sites suitable for binding the nitrogen oxides ($NO_x$) contained in the exhaust gas, in order to trap them within the device itself. However, when $NO_x$ storage in the LNT approaches its limit, LNT efficiency drops.

A LNT can be regenerated by the activation of a rich combustion mode, called $DeNO_x$ regeneration. During a $DeNO_x$ regeneration, emission levels increase significantly, especially Hydrocarbon (HC), Carbon Oxide (CO) and smoke. Since a rich combustion mode is created by injecting fuel in to the exhaust gas stream, either by after injections, namely by fuel injections in the cylinders of the engine that occur after the Top Dead Center (TDC) of the respective piston or by a dedicated injector, fuel consumption is also increased during rich phases.

Current $DeNO_x$ regeneration strategies initiate a $DeNO_x$ regeneration event when the LNT is supposed to be full of $NO_x$ and if predefined conditions about temperature and combustion stability are satisfied. However, in real driving conditions there is a high probability of undesired $DeNO_x$ regenerations interruptions, for example during urban driving or in other unfavorable conditions. When a $DeNO_x$ event is interrupted, emission levels and fuel consumption may still be higher than desired, with limited benefits in terms of $NO_x$ reduction Accordingly, there is a need in the art to provide a strategy that allows a substantial improvement in the management of $DeNO_x$ regeneration events according to the actual driving conditions of the vehicle. There is also a need in the art to define a strategy for the management of $DeNO_x$ regeneration events that does not impact significantly on fuel consumption.

SUMMARY

An embodiment of the present disclosure provides a method of controlling the operation of an aftertreatment system of a motor vehicle having a Lean $NO_x$ Trap (LNT) and a tail pipe for conveying exhaust gasses from the LNT to the external environment. A value of a first parameter indicative of a $NO_x$ content in the exhaust gasses flowing in the tail pipe is calculated. A value of a second parameter indicative of quantity of $NO_x$ stored in the LNT is also calculated. A value of a $DeNO_x$ request index is calculated as a function of the calculated value of the first parameter and of the calculated value of the second parameter. A raw threshold value of the $DeNO_x$ request index is calculated as a function of a LNT temperature and of an exhaust gas mass flow. A corrected threshold value of the $DeNO_x$ request index is calculated as a function of the raw threshold value of the $DeNO_x$ request index and of a correction factor, which is calculated as a function of a probability value of a successful completion of a $DeNO_x$ regeneration. A $DeNO_x$ regeneration is initiated when the calculated value of the $DeNO_x$ request index is larger than the corrected threshold value.

An effect of this embodiment is that it refines the control of a $DeNO_x$ regeneration start by defining and accurately calculating the probability to complete a $DeNO_x$ regeneration event successfully. If such probability is relatively low, a $DeNO_x$ regeneration event may be postponed in order to reduce interruption risks. On the other hand, if the probability to complete a $DeNO_x$ regeneration even is relatively high, a $DeNO_x$ regeneration event may be performed, or even anticipated, in order to increase the $DeNO_x$ regeneration efficiency. In such a way, the number of $DeNO_x$ regeneration events may be optimized and fuel consumption, smoke and HC/CO emission may be significantly reduced with no impact on overall $NO_x$ efficiency. Moreover, the proposed strategy allows to perform $DeNO_x$ regenerations that are longer than those of the prior art, increasing the possibility of producing $NH_3$ therefore improving the efficiency of a passive SCR, if present. Finally, the proposed strategy allows to perform a lower number of $DeNO_x$ regenerations, but with longer durations increasing the possibility of performing a LNT diagnostic check (that needs a completed $DeNO_x$) and increase the In Use Performance Ratio (IUPR) index.

According to an embodiment of the present disclosure, the probability value of a successful completion of a $DeNO_x$ regeneration is calculated.

A first probability value is calculated on the basis of a mission profile of the motor vehicle. A second probability value is calculated on the basis of $DeNO_x$ inhibitions. The probability value of the successful completion of a $DeNO_x$ regeneration is calculated as a function of the first and the second probability values. An effect of this embodiment is that the probability value of successful completion of a $DeNO_x$ regeneration is calculated in real time, taking into account the driving conditions of the vehicle.

According to a further embodiment of the present disclosure, the first probability value is calculated as a function of the mission profile of the motor vehicle and of a transmission gear. An effect of this embodiment is that it allows to calculate such first probability value taking into account the most relevant parameters of the mission profile influencing $DeNO_x$ regenerations. In particular, a calibrated map can be created by an experimental activity having as input the various mission profiles and the different possible transmission gears and, as output, the probability values of successful completion of a $DeNO_x$ regeneration as a function of a mission profile.

According to another embodiment of the present disclosure, the mission profile is determined as a function of a speed of the motor vehicle. An effect of this embodiment is that it allows to easily determine the current mission profile of the vehicle.

According to still another embodiment of the present disclosure, the second probability value is calculated as a function of a DeNOx inhibition ratio and of a DeNOx inhibition trigger number. An effect of this embodiment is that it allows to calculate such second probability value taking into account the most relevant parameters affecting the activations of a $DeNO_x$ regeneration inhibition. In particular, a calibrated map can be created by an experimental activity having as input values of the $DeNO_x$ inhibition ratio and of the $DeNO_x$ inhibition trigger number and, as output, the probability values of successful completion of a $DeNO_x$ regeneration on the activations of a $DeNO_x$ inhibition.

According to another embodiment of the present disclosure, the $DeNO_x$ inhibition ratio is calculated. During a predetermined interval of time, an amount of time during is counted for when a $DeNO_x$ regeneration is inhibited. The amount of time is divided by the predefined interval of time. An effect of this embodiment is that it allows to choose a predefined interval of time during which a calculation of a value of the $DeNO_x$ inhibition ratio is performed, while a previously calculated value is used as input for the map that returns the probability values of successful completion of a $DeNO_x$ regeneration dependent upon the activations of a $DeNO_x$ inhibition.

According to another embodiment of the present disclosure, the $DeNO_x$ inhibition trigger number is calculated by counting, during a predetermined interval of time, the number of times that a $DeNO_x$ regeneration is inhibited. An effect of this embodiment is that it allows to choose a predefined interval of time during which a calculation of a value of the $DeNO_x$ inhibition trigger number is performed, while a previously calculated value is used as input for the map that returns the probability values of successful completion of a $DeNO_x$ regeneration dependent upon the activations of a $DeNO_x$ inhibition.

Another aspect of the present disclosure provides an apparatus for controlling the operation of an aftertreatment system of a motor vehicle having a Lean $NO_x$ Trap (LNT) and a tail pipe for conveying exhaust gasses from the LNT to the external environment. The apparatus is configured to calculate a value of a first parameter indicative of a $NO_x$ content in the exhaust gasses flowing in the tail pipe, calculate a value of a second parameter indicative of quantity of $NO_x$ stored in the LNT, calculate a value of a $DeNO_x$ request index as a function of the calculated value of the first parameter and of the calculated value of the second parameter, calculate a raw threshold value of the $DeNO_x$ request index as a function of a LNT temperature and of an exhaust gas mass flow, calculate a corrected threshold value of the $DeNO_x$ request index as a function of the raw threshold value of the $DeNO_x$ request index and of a correction factor, which is calculated as a function of a probability value of a successful completion of a $DeNO_x$ regeneration, and start a $DeNO_x$ regeneration, if the calculated value of the $DeNO_x$ request index is larger than the corrected threshold value.

The effects of this aspect are similar to those of the previously described method, namely to allow to refine the control of a $DeNO_x$ regeneration start by defining and accurately calculating the probability to complete a $DeNO_x$ regeneration event successfully.

According to another aspect of the present disclosure, the probability value of a successful completion of a $DeNO_x$ regeneration is calculated. The apparatus is configured to calculate a first probability value on the basis of a mission profile of the motor vehicle, calculate a second probability value on the basis of activations of a $DeNO_x$ inhibition, and calculate the probability value of the successful completion of a $DeNO_x$ regeneration as a function of the first and the second probability values. An effect of this aspect is that the probability value of successful completion of a $DeNO_x$ regeneration is calculated in real time, taking into account the driving conditions of the vehicle.

According to another aspect the present disclosure, the apparatus is further configured to calculate the first probability value as a function of the mission profile of the motor vehicle and of a transmission gear. An effect of this aspect is that it allows to calculate such first probability value taking into account the most relevant parameters of the mission profile influencing $DeNO_x$ regenerations.

According to still another aspect of the present disclosure, the apparatus is further configured to calculate the mission profile as a function of a speed of the motor vehicle are provided. An effect of this aspect is that it allows to easily determine the current mission profile of the vehicle.

According to another aspect, the apparatus is further configured to calculate the second probability value as a function of a $DeNO_x$ inhibition ratio and of a $DeNO_x$ inhibition trigger number are provide. An effect of this aspect is that it allows to calculate such second probability taking into account the most relevant parameters affecting the activations of a $DeNO_x$ regeneration inhibition.

According to another aspect of the present disclosure, the $DeNO_x$ inhibition ratio the $DeNO_x$ inhibition ratio is calculated. In particular, during a predetermined interval of time, the apparatus is configured to count an amount of time during which a $DeNO_x$ regeneration is inhibited, and divide the amount of time by the predefined interval of time. An effect of this aspect is that it allows to choose a predefined interval of time during which a calculation of a value of the $DeNO_x$ inhibition ratio is performed, while a previously calculated value is used as input for the map that returns the probability values of successful completion of a $DeNO_x$ regeneration dependent upon the activations of a DeNOx inhibition.

According to another aspect of the present disclosure, the apparatus is configured to calculate the $DeNO_x$ inhibition trigger number by counting, during a predetermined interval of time, the number of times that a $DeNO_x$ regeneration is inhibited may be provided. An effect of this aspect is that it allows to choose a predefined interval of time during which a calculation of a value of the $DeNO_x$ inhibition trigger number is performed, while a previously calculated value is used as input for the map that returns the probability values of successful completion of a $DeNO_x$ regeneration dependent upon the activations of a $DeNO_x$ inhibition.

The method and apparatus according to one of the aspects described above can be carried out with the help of a computer program including a program-code, and in the form of computer program product including the computer program. The computer program product can be embodied as a control apparatus for an internal combustion engine, including an electronic control unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
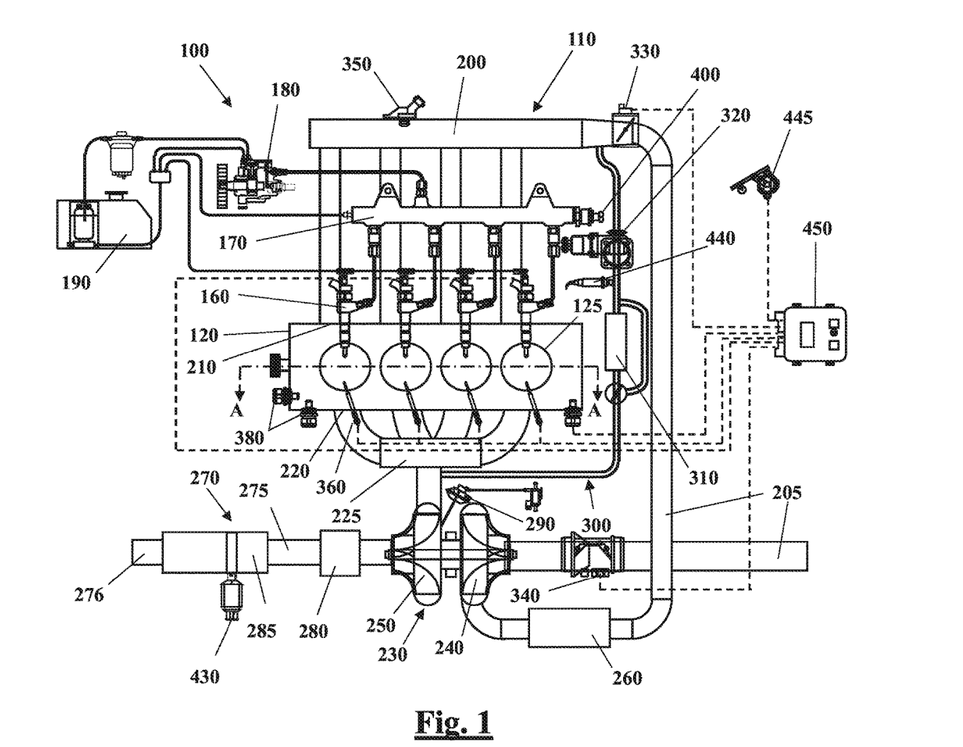
FIG. 1 shows an automotive system.
Figure 2:
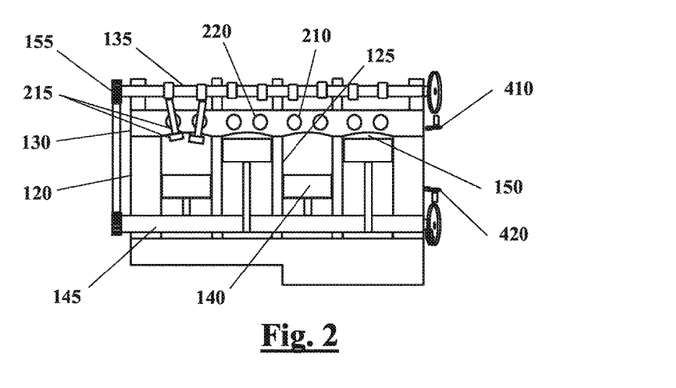
FIG. 2 is a cross-section of an internal combustion engine belonging to the automotive system of FIG. 1.

Some embodiments may include an automotive system 100 for powering a vehicle 105, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high-pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust line 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NO$_x$ traps, hydrocarbon adsorbers, selective catalytic reduction (SCR) systems, and particulate filters, such as a Diesel Particulate Filter (DPF). In particular, the aftertreatment system 270 includes a lean NO$_x$ trap (LNT) 285.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of a conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
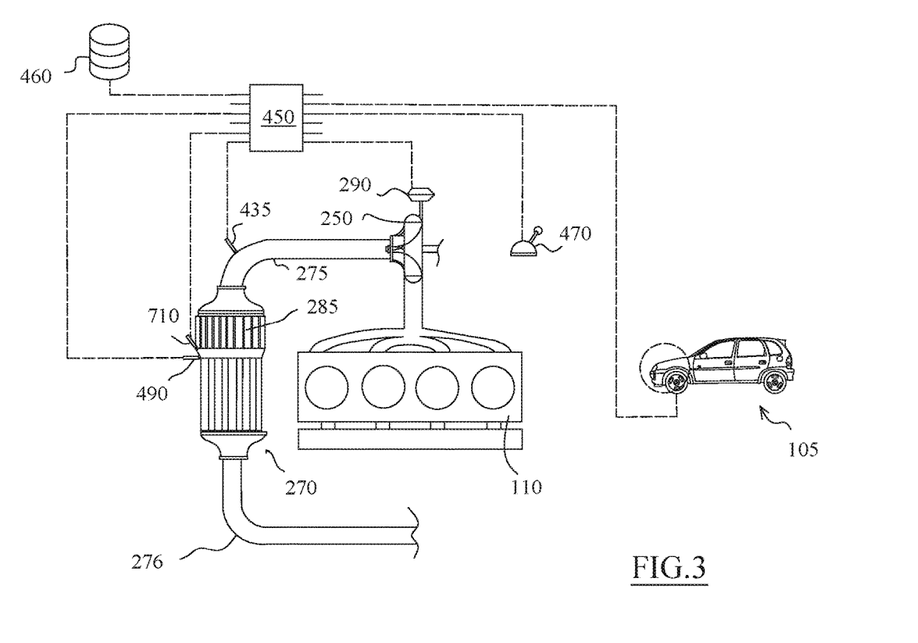
FIG. 3 shows a portion of the automotive system of FIG. 1.

FIG. 3 shows a portion of the automotive system 100 of FIG. 1 having an exhaust line 275, a Lean $NO_x$ Trap (LNT) 285 is provided upstream of a tail pipe 276. The tail pipe 276 is a portion of the exhaust line 275 which is provided for conveying the exhaust gasses from the LNT 285 to the external environment, possibly after passing through additional aftertreatment devices. A temperature sensor 710 downstream of the LNT, a temperature sensor 435 upstream of the LNT 285 and a $NO_x$ sensor downstream of the LNT 490 are also provided in the automotive system 100.

Figure 4:
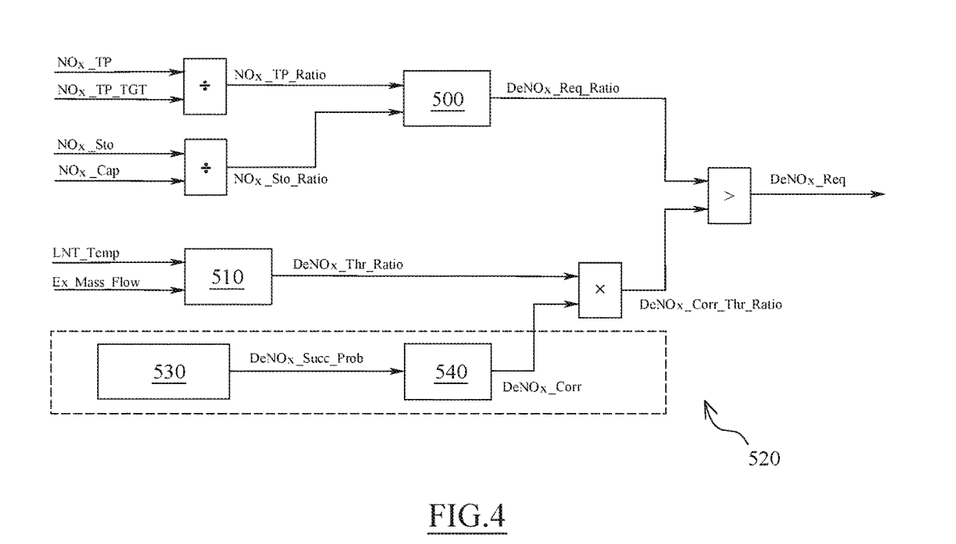
FIG. 4 is a graph representing an embodiment of the present disclosure.

A $DeNO_x$ regeneration is requested if a $DeNO_x$ request index value DeNOx_Req_Ratio is higher than a corrected DeNOx request index threshold DeNOx_Corr_Thr_Ratio. In this case, a Boolean variable DeNOx_Req is set to 1. The $DeNO_x$ request index value DeNOx_Req_Ratio may be the output of a map 500 that has as input a first parameter NOx_TP_Ratio indicative of a $NO_x$ content in the exhaust gas flowing in the tail pipe 276 and a second parameter NOx_Sto_Ratio indicative of a $NO_x$ quantity stored in the LNT 285.

In turn, the value of the first parameter NOx_TP_Ratio may be calculated by dividing a current $NO_x$ tail pipe emission value NOx_TP by a predetermined target $NO_x$ tail pipe emission value NOx_TP_TGT. The current $NO_x$ tail pipe emission value NOx_TP can be measured by means of the $NO_x$ sensor downstream of the LNT 490.

Moreover, the value of the second parameter NOx_Sto_Ratio may be calculated by dividing a current $NO_x$ Storage value NOx_Sto by a $NO_x$ Capacity NOx_Cap of the LNT 285. The current $NO_x$ Storage value NOx_Sto can be estimated, for example, by means of an estimation of the $NO_x$ engine out values and by using a $NO_x$ storage efficiency model taking into account, for example, the temperature and mass flow of the exhaust gas that flow through the LNT 285.

The $DeNO_x$ request index value DeNOx_Req_Ratio is a measure of the urgency of LNT cleaning and therefore of a $DeNO_x$ regeneration. On the other hand, the corrected $DeNO_x$ request index threshold DeNOx_Corr_Thr_Ratio may be calculated as a function of a $DeNO_x$ request index raw threshold value DeNOx Thr Ratio and of a correction factor DeNOx_Corr calculated according to an enhanced logic (dotted box 520). The $DeNO_x$ index raw threshold value DeNOx_Thr_Ratio is the output of a map 510 that has as input an LNT temperature value LNT_temp and an exhaust gas mass flow value Ex_Mass_Flow.

The LNT temperature value LNT_temp can be calculated by averaging the measures of the LNT upstream temperature sensor 435 and of the LNT downstream temperature sensor 710.

The exhaust gas mass flow value Ex_Mass_Flow can be estimated by using the Mass Air Flow sensor 340 (FIG. 1) and an estimation of the fuel injected by the injectors 160.

The aim of using the $DeNO_x$ index raw threshold value DeNOx_Thr_Ratio is to define a physical area where a $DeNO_x$ regeneration may be effective in terms of regeneration efficiency. The correction factor DeNOx_Corr may be calculated as a function (Block 540) of a probability value of a successful completion of a $DeNO_x$ regeneration event DeNOx_Succ_Prob (block 530). As mentioned above, if the $DeNO_x$ request index value DeNOx_Req_Ratio is larger than the corrected $DeNO_x$ request index threshold DeNOx_Corr_Thr_Ratio, a $DeNO_x$ regeneration event is started.

Figure 5:
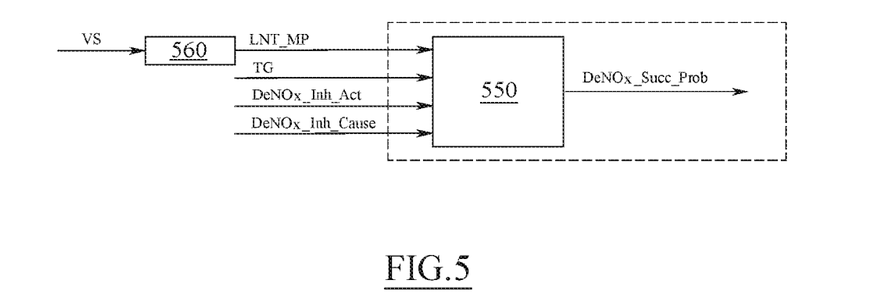
FIG. 5 is a graph representing the calculation of a successful probability of completion of a DeNO$_x$ regeneration.

FIG. 5 shows a graph representing the calculation of a successful probability of completion of a $DeNO_x$ regeneration DeNOx_Succ_Prob. The $DeNO_x$ successful probability of completion value DeNOx_Succ_Prob is calculated (block 550) as a function of several variables, namely of a LNT mission profile LNT_MP, of a transmission gear TG, of a $DeNO_x$ inhibition active Boolean value DeNOX_Inh_Act and of a $DeNO_x$ inhibition cause value. In turn, a LNT mission profile LNT_MP is calculated as a function of a vehicle 105 speed VS (block 560).

Figure 6:
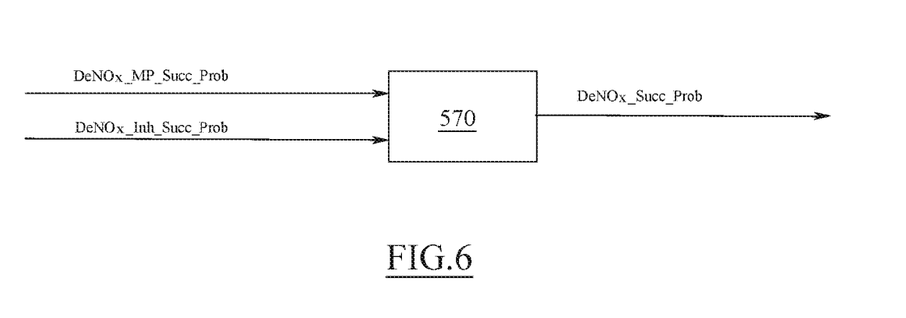
FIG. 6 is a graph representing the calculation of a successful probability of completion of a DeNO$_x$ regeneration.

FIG. 6 shows a graph representing a step of the calculation of a $DeNO_x$ successful probability of completion value DeNOx_Succ_Prob. The $DeNO_x$ successful probability of completion value DeNOx_Succ_Prob is the output of a map 570 having as input the first $DeNO_x$ completion successful probability on the basis of a mission profile DeNOx_MP_Succ_Prob and the second DeNOx completion successful probability on the basis of activations of inhibition DeNOx_Inh_Succ_Prob.

Figure 7:
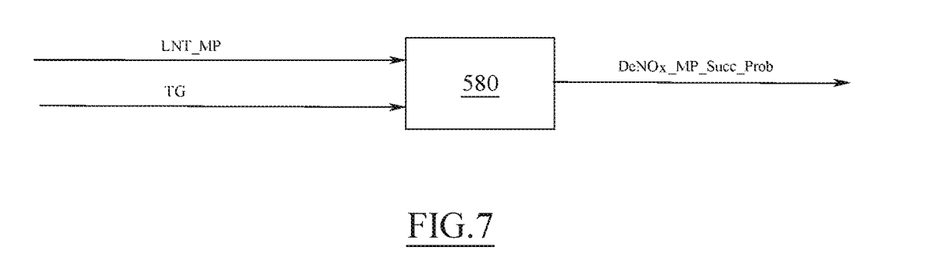
FIG. 7 is a graph representing the calculation of DeNOx first successful probability of completion on the basis of a mission profile.

FIG. 7 shows a graph representing the calculation of first DeNOx completion successful probability on the basis of a mission profile DeNOx_MP_Succ_Prob. The first DeNOx completion successful probability on the basis of a mission profile DeNOx_MP_Succ_Prob is a parameter that takes into account the effect of a particular mission profile on the probability of successfully completing a $DeNO_x$ regeneration. The actual value of the DeNOx completion successful probability on the basis of a mission profile DeNOx_MP_Succ_Prob is the output of a map 570 having as input the LNT mission profile LNT_MP and the transmission gear TG. The transmission gear TG can be monitored by the ECU 450 connected to a gearbox 470.

Figure 8:
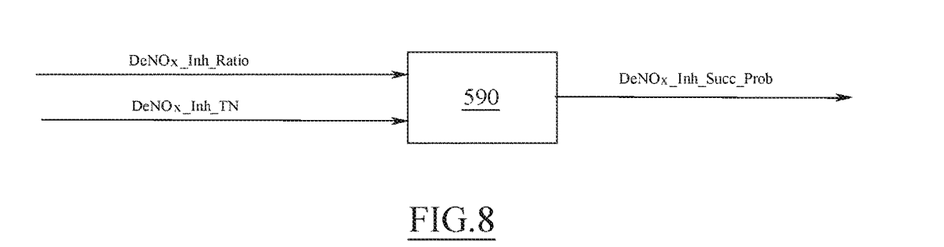
FIG. 8 is a graph representing the calculation of a DeNOx second successful probability of completion on the basis of activations of inhibition.

FIG. 8 shows a graph representing the calculation of a DeNOx completion successful probability on the basis of activations of inhibition. The DeNOx completion successful probability on the basis of activations of inhibition DeNOX_Inh_Succ_Prob is a parameter that takes into account the effect of the various inhibition causes on the probability of successfully completing a $DeNO_x$ regeneration. The actual value of the $DeNO_x$ completion successful probability on the basis of activations of inhibition DeNOX_Inh_Succ_Prob is the output of a map 580 that has as input a DeNOx inhibition ratio DeNOx_Inh_Ratio and a DeNOx inhibition trigger number DeNOx_Inh_TN.

Figure 9:
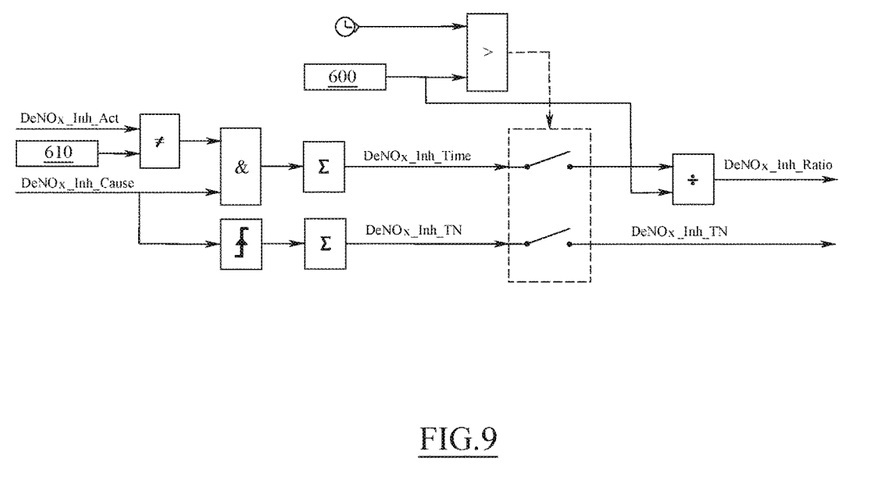
FIG. 9 is a graph representing the calculation of a DeNOx inhibition ratio and of a DeNOx inhibition trigger number.

FIG. 9 shows a graph representing the calculation of the $DeNO_x$ inhibition ratio DeNOx_Inh_Ratio and of the DeNOx inhibition trigger number DeNOx_Inh_TN. The above calculation is performed during a predetermined time interval 600. The DeNO$_x$ inhibition ratio DeNOx_Inh_Ratio is calculated following the steps of counting, during the predetermined interval of time, an amount of time during which a DeNO$_x$ regeneration is inhibited DeNOx_Inh_Time and dividing the amount of time by the predetermined interval of time 600. In turn, the DeNO$_x$ inhibition time DeNOx_Inh_Time is calculated by summing the time during which a DeNO$_x$ inhibition is active DeNOx_Inh_Act for each of the DeNO$_x$ inhibition causes DeNOx_Inh_Cause DeNOx, except for a lock time 610.

Examples of DeNO$_x$ inhibition causes are: a maximum DeNO$_x$ duration that is larger than a predefined threshold thereof; an exhaust gas temperature at LNT inlet outside a predetermined admissible range; an exhaust gas temperature at LNT outlet outside a predetermined admissible range; exhaust gas temperature at turbine inlet too high (for HW protection) due to engine working point (predefined high engine speed/torque thresholds); an engine working point (in terms of engine speed and engine torque) outside a predetermined admissible range for performing a DeNO$_x$ regeneration; and an engine coolant temperature outside a predetermined admissible range. Other DeNO$_x$ inhibition causes may be considered.

The lock time 610 is the minimum interval of time that must be allowed from the end of a previous DeNO$_x$ regeneration before starting a subsequent DeNO$_x$ regeneration. The DeNO$_x$ inhibition trigger number DeNOx_Inh_TN is calculated by counting, during the predetermined interval of time 600, the number of times that a DeNO$_x$ regeneration is inhibited.

Figure 10:
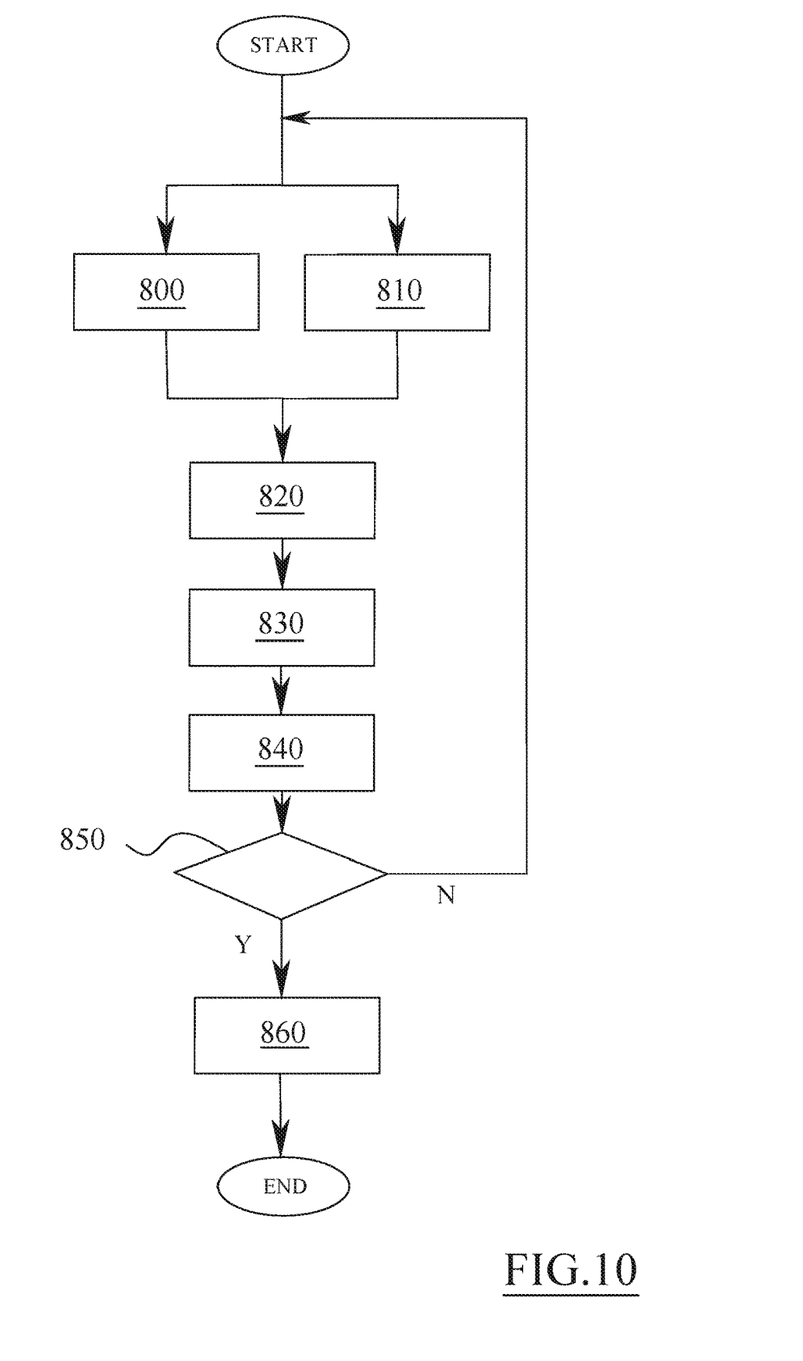
FIG. 10 is a flowchart representing an embodiment of the present disclosure.

FIG. 10 is a flowchart representing an embodiment of the present disclosure. As a first step, the value of first parameter indicative of a NO$_x$ content in the exhaust gasses flowing in the tail pipe NOx_TP_Ratio is monitored (block 800). Also, the value of a second parameter indicative of a NO$_x$ content in the LNT NOx_Sto_Ratio in the LNT is monitored (block 810). Then a DeNO$_x$ request index value DeNOx_Req_Ratio is calculated as a function of the map 500 having as input the parameter indicative of a NO$_x$ content in the exhaust gas flowing in the tail pipe NOx_TP_Ratio and the parameter indicative of a NO$_x$ content in the LNT NOx_Sto_Ratio in the LNT (block 820). Then a DeNO$_x$ request index raw threshold DeNOx_Ratio_Thr is calculated as a function of a map 580 having as input a LNT temperature LNT_Temp and an exhaust gas mass flow Ex_Mass_Flow (block 830). Finally, a corrected DeNO$_x$ request index threshold value DeNOx_Corr_Thr_Ratio is calculated as a function of the DeNO$_x$ request index value DeNOx_Req_Ratio and of a correction factor DeNOx_Corr (block 840).

In turn, the correction factor DeNOx_Corr is a function of a probability value of a successful completion of the DeNO$_x$ regeneration event DeNOx_Succ_Prob. Then a check is made to verify if the DeNO$_x$ request index value DeNOx_Req_Ratio is larger than the corrected DeNO$_x$ request index threshold value DeNOx_Corr_Thr_Ratio (block 850). If the answer is negative, the cycle is repeated starting from the operation defined in blocks 800 and 810. If the answer is positive, a DeNO$_x$ regeneration event is started (block 860).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of controlling the operation of an aftertreatment system of a motor vehicle having a Lean NO$_x$ Trap (LNT) and a tail pipe for conveying exhaust gasses from the LNT to the external environment comprising:
    calculating a value of a first parameter (NOx_TP_Ratio) indicative of a NO$_x$ content in the exhaust gasses flowing in the tail pipe;
    calculating a value of a second parameter (NOx_Sto_Ratio) indicative of quantity of NO$_x$ stored in the LNT;
    calculating a value of a DeNO$_x$ request index (DeNOx_Req_Ratio) as a function of the calculated value of the first parameter (NOx_TP_Ratio) and of the calculated value of the second parameter (NOx_Sto_Ratio);
    calculating a raw threshold value of the DeNO$_x$ request index (DeNOx_Ratio_Thr) as a function of a LNT temperature (LNT_Temp) and of an exhaust gas mass flow (Ex_Mass_Flow);
    calculating a corrected threshold value of the DeNO$_x$ request index (DeNOx_Corr_Thr_Ratio) as a function of the raw threshold value of the DeNO$_x$ request index (DeNOx_Req_Ratio) and of a correction factor (DeNOx_Corr), wherein the correction factor (DeNOx_Corr) is calculated as a function of a probability value of a successful completion of a DeNO$_x$ regeneration (DeNOx_Succ_Prob); and
    initiating a DeNO$_x$ regeneration when the calculated value of the DeNO$_x$ request index (DeNOx_Req_Ratio) is larger than the corrected threshold value (DeNOx_Corr_Thr_Ratio).

2. The method according to claim 1, wherein calculating the probability value of a successful completion of a DeNO$_x$ regeneration (DeNOx_Succ_Prob) comprises:
    calculating a first probability value on the basis of a mission profile (DeNOx_MP_Succ_Prob) of the motor vehicle;
    calculating a second probability value on the basis of DeNO$_x$ inhibitions (DeNOx_Inh_Succ_Prob); and
    calculating the probability value of the successful completion of a DeNO$_x$ regeneration (DeNOx_Succ_Prob) as a function of the first and the second probability values.

3. The method according to claim 2, further comprising calculating the first probability value as a function of the mission profile of the motor vehicle and of a transmission gear.

4. The method according to claim 2, further comprising determining the mission profile as a function of a speed (VS) of the motor vehicle.

5. The method according to claim 2, further comprising calculating the second probability value as a function of a DeNOx_inhibition ratio (DeNOx_Inh_Ratio) and of a DeNOx inhibition trigger number (DeNOx_Inh_TN).

6. The method according to claim 5, wherein calculating the DeNOx inhibition ratio (DeNOx_Inh_Ratio) comprises:
    counting, during a predetermined interval of time, an amount of time during which a DeNO$_x$ regeneration is inhibited (DeNOx_Inh_Time); and
    dividing said amount of time by the predetermined interval of time.

7. The method according to claim 5, wherein calculating the DeNOx inhibition trigger number (DeNOx_Inh_TN) comprises counting, during a predetermined interval of time, the number of times that a $DeNO_x$ regeneration is inhibited.

8. An apparatus for controlling the operation of an aftertreatment system (270) of a motor vehicle having a Lean $NO_x$ Trap (LNT) and a tail pipe for conveying exhaust gasses from the LNT to the external environment, the apparatus comprising an electronic control unit, a data carrier having a computer program stored therein, which when executed on the electronic control unit, is configured to:
- calculate a value of a first parameter (NOx_TP_Ratio) indicative of a $NO_x$ content in the exhaust gasses flowing in the tail pipe;
- calculate a value of a second parameter (NOx_Sto_Ratio) indicative of quantity of $NO_x$ stored in the LNT;
- calculate a value of a $DeNO_x$ request index (DeNOx_Req_Ratio) as a function of the calculated value of the first parameter (NOx_TP_Ratio) and of the calculated value of the second parameter (NOx_Sto_Ratio);
- calculate a raw threshold value of the $DeNO_x$ request index (DeNOx_Ratio_Thr) as a function of a LNT temperature (LNT_Temp) and of an exhaust gas mass flow (Ex_Mass_Flow);
- calculate a corrected threshold value of the $DeNO_x$ request index (DeNOx_Corr_Thr_Ratio) as a function of the raw threshold value of the $DeNO_x$ request index (DeNOx_Req_Ratio) and of a correction factor (DeNOx_Corr), the correction factor (DeNOx_Corr) being calculated as a function of a probability value of a successful completion of a $DeNO_x$ regeneration (DeNOx_Succ_Prob); and
- initiate a $DeNO_x$ regeneration when the calculated value of the $DeNO_x$ request index (DeNOx_Req_Ratio) is larger than the corrected threshold value (DeNOx_Corr_Thr_Ratio).

9. A non-transitory computer readable medium comprising a computer program having computer-code stored thereon, which when executed on a processor, is configured to:
- calculate a value of a first parameter (NOx_TP_Ratio) indicative of a $NO_x$ content in the exhaust gasses flowing in the tail pipe;
- calculate a value of a second parameter (NOx_Sto_Ratio) indicative of quantity of $NO_x$ stored in the LNT;
- calculate a value of a $DeNO_x$ request index (DeNOx_Req_Ratio) as a function of the calculated value of the first parameter (NOx_TP_Ratio) and of the calculated value of the second parameter (NOx_Sto_Ratio);
- calculate a raw threshold value of the $DeNO_x$ request index (DeNOx_Ratio_Thr) as a function of a LNT temperature (LNT_Temp) and of an exhaust gas mass flow (Ex_Mass Flow);
- calculate a corrected threshold value of the $DeNO_x$ request index (DeNOx_Corr_Thr_Ratio) as a function of the raw threshold value of the $DeNO_x$ request index (DeNOx_Req_Ratio) and of a correction factor (DeNOx_Corr), the correction factor (DeNOx_Corr) being calculated as a function of a probability value of a successful completion of a $DeNO_x$ regeneration (DeNOx_Succ_Prob); and
- initiate a $DeNO_x$ regeneration when the calculated value of the $DeNO_x$ request index (DeNOx_Req_Ratio) is larger than the corrected threshold value (DeNOx_Corr_Thr_Ratio).

* * * * *